No. 862,896. PATENTED AUG. 13, 1907.
J. R. FORDYCE.
TROLLEY FOR CARRYING BALES OF COTTON.
APPLICATION FILED NOV. 21, 1906.
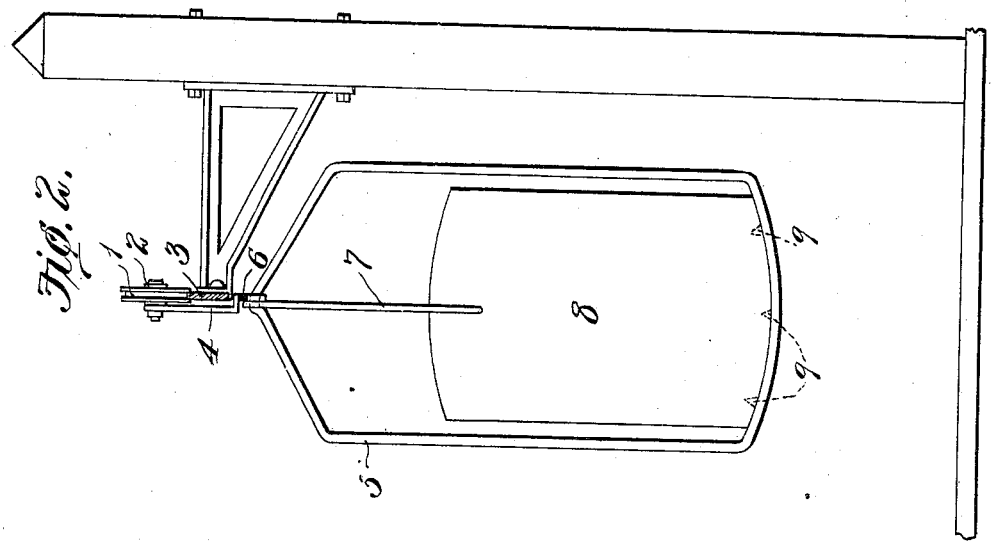
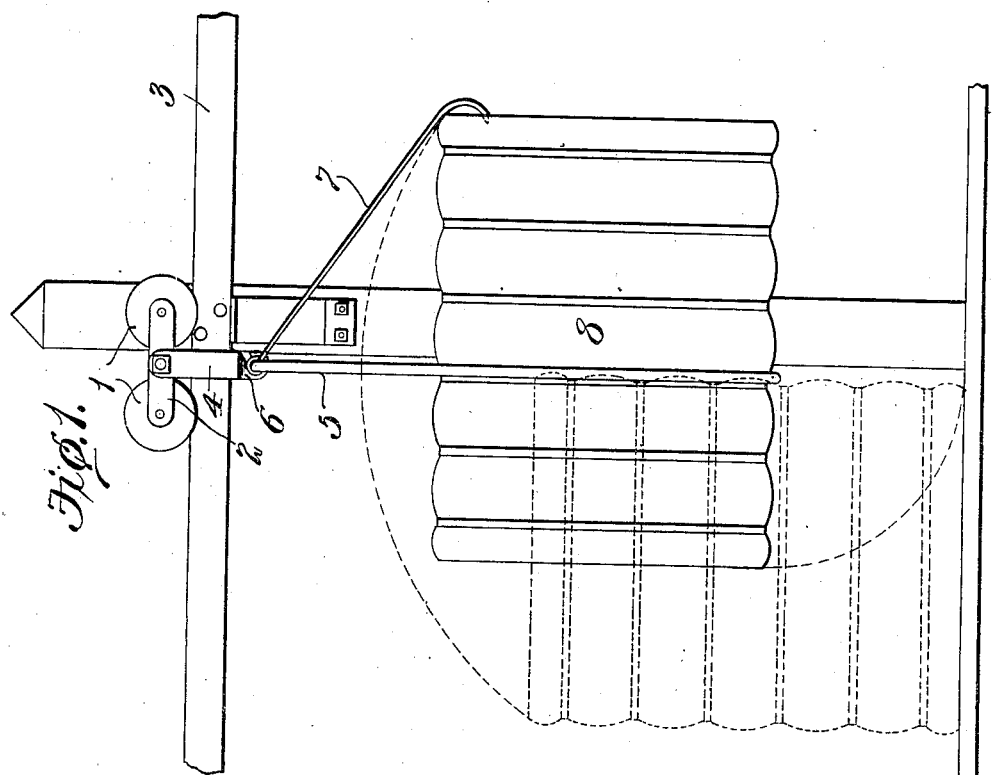
Witnesses:
Edgar T. Farmer
Nells L. Church
Inventor,
John R. Fordyce,
By Bakewell Cornwall
attys.

UNITED STATES PATENT OFFICE.

JOHN R. FORDYCE, OF LITTLE ROCK, ARKANSAS.

TROLLEY FOR CARRYING BALES OF COTTON.

No. 862,896.     Specification of Letters Patent.     Patented Aug. 13, 1907.

Application filed November 21, 1906. Serial No. 344,444.

*To all whom it may concern:*

Be it known that I, JOHN R. FORDYCE, a citizen of the United States, residing at Little Rock, Pulaski county, Arkansas, have invented a certain new and useful Improvement in Trolleys for Carrying Bales of Cotton, of which the following is a full, clear, and exact description, such as will enable others skilled in the art to which it appertains to make and use the same, reference being had to the accompanying drawings, forming part of this specification, in which—

Figure 1 is a side elevational view showing a trolley or conveyer embodying the features of my invention in operative position on a track; and Fig. 2 is an end view of the parts shown in Fig. 1.

This invention relates to devices for carrying bales of cotton.

The object of my invention is to provide a trolley or conveyer of simple construction, having means for supporting a bale of cotton in an elevated position.

Referring to the drawings which represent the preferred form of my invention, 1 designates grooved wheels or rollers which are journaled in a frame 2, said rollers being designed to travel on a track 3. A bar 4 projects downwardly from the frame 2 and extends beneath the track to prevent the conveyer from jumping off the track. A member for supporting a bale of cotton is connected to the frame of the trolley and consists of a yoke 5, the upper cross-piece of which rests in an inclined slot formed in a downwardly projecting lug 6 on that portion of the bar 4 which extends beneath the track. Preferably, the yoke 5 consists of a continuous bar of iron bent into the form shown in Fig. 2 and having its lower cross-piece curved slightly to conform to the curvature of the side of the bale. A hook 7 is fulcrumed on the upper cross-piece of the yoke 5 for engaging one end of the bale 8 supported by the yoke, the lower cross-piece of the yoke being provided with pointed projections or teeth 9 which extend into the bale and prevent it from shifting in the yoke.

To place a bale of cotton on the trolley, the bale is moved under the track and in alinement with the yoke, as shown in broken lines in Fig. 1, the lower cross-piece of the yoke being located below the center of the bale. The bale can then be tilted upwardly on the lower cross-piece of the yoke as a fulcrum until it assumes a horizontal position, as shown in full lines in Fig. 1 and the hook 7 then engages the upper end of the bale to retain it in its horizontal position. A conveyer of this description comprises very few parts so that it can be manufactured cheaply and as a bale can be placed in the yoke or removed therefrom with very little trouble, it forms a very efficient device for carrying bales of cotton. Another desirable feature of such a construction is that the supporting device can be disconnected from the frame of the trolley by simply lifting the yoke out of the slot in the lug 6.

Instead of standing the bale on its end underneath the track, as shown in dotted lines in Fig. 1, and then tilting it into the yoke of the conveyer, I can use a device for holding it in a horizontal position just a trifle higher than the lower cross-piece of the yoke so that when the conveyer comes along it will automatically pick up the bale.

Having thus described my invention, what I claim as new and desire to secure by Letters Patent is:

1. A trolley or conveyer for carrying bales of cotton, consisting of a frame, a yoke-shaped member supported by said frame, and a device for engaging one end of the bale to hold it in a horizontal position in the yoke; substantially as described.

2. A trolley or conveyer for carrying bales of cotton, consisting of a frame provided with wheels adapted to travel on a track, a yoke removably connected to said frame for receiving a bale of cotton, and a hook pivotally connected to the upper cross-piece of the yoke for engaging one end of the bale to hold it in a horizontal position; substantially as described.

3. A trolley or conveyer for carrying bales of cotton, consisting of a frame provided with wheels adapted to travel on a track, a bar depending from said frame and having a horizontal portion which projects laterally beneath the track on which the conveyer travels, a lug on said horizontal portion provided with an inclined slot, a yoke consisting of a continuous strap of iron mounted in said inclined slot and adapted to support a bale of cotton, and a hook journaled in the upper cross-piece of the yoke for engaging one end of the bale to hold it in a horizontal position; subtantially as described.

In testimony whereof I hereunto affix my signature in the presence of two witnesses, this 30 day of October 1906.

JOHN R. FORDYCE.

Witnesses:
COLUMBUS BIERCE,
A. G. CRAWFORD.